United States Patent
Tong et al.

(10) Patent No.: US 12,532,271 B2
(45) Date of Patent: Jan. 20, 2026

(54) METHOD FOR SENDING DATA AND APPARATUS, STORAGE MEDIUM, PROCESSOR, AND ACCESS POINT (AP) TERMINAL

(71) Applicant: TP-LINK CORPORATION LIMITED, Hong Kong (HK)

(72) Inventors: Di Tong, Shenzhen (CN); Wanyi Li, Shenzhen (CN)

(73) Assignee: TP-LINK CORPORATION LIMITED, Hong Kong (CN)

( * ) Notice: Subject to any disclaimer, the term of this patent is extended or adjusted under 35 U.S.C. 154(b) by 0 days.

(21) Appl. No.: 18/419,898

(22) Filed: Jan. 23, 2024

(65) Prior Publication Data

US 2024/0172138 A1  May 23, 2024
US 2025/0261134 A9  Aug. 14, 2025

Related U.S. Application Data (63) Continuation of application No. 18/287,181, filed as application No. PCT/CN2022/131523 on Nov. 11, 2022, now abandoned.

(30) Foreign Application Priority Data

Dec. 17, 2021  (CN) .......................... 202111554996.7

(51) Int. Cl.
*H04W 52/36* (2009.01)
(52) U.S. Cl.
CPC ................................ *H04W 52/367* (2013.01)

(58) Field of Classification Search
CPC ................ H04W 52/36; H04W 52/367; H04L 1/00026; H04L 1/0029
See application file for complete search history.

(56) References Cited

U.S. PATENT DOCUMENTS 8,107,404 B2 * 1/2012 Utsunomiya ....... H04W 72/541
370/278
9,673,956 B2 * 6/2017 Liu ....................... H04W 48/16
(Continued)

FOREIGN PATENT DOCUMENTS

CN  103906263 A  7/2014
CN  110972311 A  4/2020
(Continued)

OTHER PUBLICATIONS

International Search Report issued in PCT/CN2022/131523, dated Jan. 18, 2023, 4 pages.

*Primary Examiner* — Hai V Nguyen
(74) *Attorney, Agent, or Firm* — LOEB & LOEB LLP (57) ABSTRACT

Disclosed is a method for sending data and apparatus, a storage medium, a processor, and an Access Point (AP) terminal. The method for sending data includes: receiving an Overlap Basic Service Set (OBSS) interference signal; determining whether a data sending condition is satisfied according to the OBSS interference signal; determining a plurality of maximum available transmission power corresponding to a plurality of Stations (STAs) in a case where the data sending condition is satisfied; and controlling the sending of the data to a target STA, the target STA being a STA with a maximum of the maximum available transmission power corresponding to the plurality of STAs.

20 Claims, 2 Drawing Sheets

(56) References Cited

U.S. PATENT DOCUMENTS

| | | | |
|---|---|---|---|
| 9,749,967 B2* | 8/2017 | Wang | H04W 74/0816 |
| 9,801,184 B2* | 10/2017 | Noh | H04W 72/046 |
| 10,021,694 B2* | 7/2018 | Noh | H04W 74/0816 |
| 10,038,543 B2* | 7/2018 | Wang | H04B 7/0452 |
| 10,159,093 B2* | 12/2018 | Zhou | H04W 74/006 |
| 10,172,137 B1* | 1/2019 | Hedayat | H04W 74/02 |
| 10,278,022 B2* | 4/2019 | Zhou | H04W 74/0816 |
| 10,285,203 B2* | 5/2019 | Hedayat | H04L 5/0025 |
| 10,348,394 B1* | 7/2019 | Bakr | H04B 7/2041 |
| 10,356,624 B2* | 7/2019 | Cariou | H04W 52/343 |
| 10,366,064 B2* | 7/2019 | Cariou | G09G 5/393 |
| 10,433,345 B2* | 10/2019 | Kim | H04W 52/0229 |
| 10,454,650 B2* | 10/2019 | Kim | H04W 52/243 |
| 10,470,128 B2* | 11/2019 | Noh | H04W 52/0229 |
| 10,470,138 B2* | 11/2019 | Kwon | H04W 52/246 |
| 10,516,457 B2* | 12/2019 | Wang | H04W 74/0816 |
| 10,568,044 B2* | 2/2020 | Takata | H04W 52/18 |
| 10,623,964 B2* | 4/2020 | Ko | H04W 52/34 |
| 10,645,724 B2* | 5/2020 | Yu | H04W 74/0808 |
| 10,677,907 B2* | 6/2020 | Orlowski | G01S 7/4802 |
| 10,743,185 B2* | 8/2020 | Xiang | H04W 74/0816 |
| 10,750,536 B2* | 8/2020 | Zhang | H04W 74/006 |
| 10,764,900 B1* | 9/2020 | Gopalakrishnan | H04W 72/0446 |
| 10,880,894 B2* | 12/2020 | Xia | H04B 7/0417 |
| 10,904,053 B2* | 1/2021 | Lim | H04L 5/0012 |
| 11,013,033 B2* | 5/2021 | Fischer | H04W 72/046 |
| 11,115,111 B1* | 9/2021 | Bakr | H04B 7/2041 |
| 11,122,578 B2* | 9/2021 | Zhu | H04W 52/00 |
| 11,134,449 B2* | 9/2021 | Bhushan | H04L 1/0003 |
| 11,140,556 B2* | 10/2021 | Ko | H04W 16/02 |
| 11,191,038 B2* | 11/2021 | Park | H04W 52/243 |
| 11,337,085 B2* | 5/2022 | Sugaya | H04L 5/0048 |
| 11,438,925 B2* | 9/2022 | Lv | H04B 17/318 |
| 11,503,633 B2* | 11/2022 | Zhang | H04W 74/006 |
| 11,510,157 B1* | 11/2022 | Hathi | H04W 52/367 |
| 11,528,708 B2* | 12/2022 | Hedayat | H04W 74/02 |
| 11,570,663 B2* | 1/2023 | Dakshinkar | H04W 16/10 |
| 11,611,885 B2* | 3/2023 | Minotani | H04L 27/0006 |
| 11,647,489 B2* | 5/2023 | Ahn | H04W 84/12 370/329 |
| 11,665,678 B2* | 5/2023 | Li | H04W 72/02 370/329 |
| 11,671,837 B2* | 6/2023 | Wang | H04W 48/20 370/252 |
| 11,671,853 B2* | 6/2023 | Sugaya | H04L 5/0094 370/329 |
| 11,678,318 B2* | 6/2023 | Xia | H04W 16/28 370/329 |
| 11,683,774 B2* | 6/2023 | Oteri | H04W 8/005 370/329 |
| 11,683,833 B2* | 6/2023 | Zhang | H04W 74/0808 370/336 |
| 11,700,636 B2* | 7/2023 | Lanante | H04W 52/243 370/329 |
| 11,716,758 B2* | 8/2023 | Chendamarai Kannan | H04W 74/0816 370/329 |
| 11,726,184 B2* | 8/2023 | Ferreira | G01S 17/894 356/4.01 |
| 11,729,726 B2* | 8/2023 | Chande | H04W 52/30 455/522 |
| 11,751,247 B2* | 9/2023 | Nunome | H04W 74/08 370/338 |
| 11,784,766 B2* | 10/2023 | Guo | H04W 72/044 370/329 |
| 11,805,551 B2* | 10/2023 | Sun | H04W 74/0808 |
| 11,832,282 B2* | 11/2023 | Houghton | H04W 72/52 |
| 11,926,993 B2* | 3/2024 | Verma | H04W 52/50 |
| 11,943,625 B2* | 3/2024 | Park | H04L 5/0044 |
| 11,956,763 B2* | 4/2024 | D'Oro | H04W 72/0453 |
| 11,997,712 B2* | 5/2024 | Lv | H04B 17/318 |
| 12,160,378 B2* | 12/2024 | Guo | H04W 74/04 |
| 2005/0249322 A1* | 11/2005 | Gerlach | H04W 36/06 375/355 |
| 2008/0037665 A1* | 2/2008 | Maeki | H04W 16/16 375/260 |
| 2011/0044257 A1* | 2/2011 | Utsunomiya | H04W 72/541 370/329 |
| 2016/0006554 A1* | 1/2016 | Wang | H04L 5/0073 370/329 |
| 2016/0066257 A1* | 3/2016 | Liu | H04L 5/006 370/329 |
| 2016/0183304 A1* | 6/2016 | Fischer | H04B 17/336 370/278 |
| 2016/0249397 A1* | 8/2016 | Seok | H04L 5/0075 |
| 2016/0330663 A1* | 11/2016 | Zhou | H04W 4/025 |
| 2017/0064644 A1* | 3/2017 | Cariou | H04W 52/243 |
| 2017/0064695 A1* | 3/2017 | Zhou | H04L 1/0027 |
| 2017/0064739 A1* | 3/2017 | Hedayat | H04L 5/0037 |
| 2017/0064740 A1* | 3/2017 | Zhou | H04W 74/006 |
| 2017/0070962 A1* | 3/2017 | Wang | H04W 52/247 |
| 2017/0086206 A1* | 3/2017 | Wang | H04W 72/542 |
| 2017/0105217 A1* | 4/2017 | Kwon | H04W 52/245 |
| 2017/0142659 A1* | 5/2017 | Noh | H04W 52/0229 |
| 2017/0188376 A1* | 6/2017 | Noh | H04W 52/42 |
| 2017/0230981 A1* | 8/2017 | Ryu | H04W 74/006 |
| 2017/0255659 A1* | 9/2017 | Cariou | H04B 7/0413 |
| 2017/0311329 A1* | 10/2017 | Barriac | H04W 74/0808 |
| 2018/0014270 A1* | 1/2018 | Noh | H04W 74/0816 |
| 2018/0014327 A1* | 1/2018 | Park | H04W 74/006 |
| 2018/0084548 A1* | 3/2018 | Min | H04L 5/0014 |
| 2018/0084554 A1* | 3/2018 | Chu | H04W 52/50 |
| 2018/0109298 A1* | 4/2018 | Elsherif | H04B 7/0452 |
| 2018/0110046 A1* | 4/2018 | Patil | H04W 72/0446 |
| 2018/0139635 A1* | 5/2018 | Oteri | H04J 11/00 |
| 2018/0167926 A1* | 6/2018 | Xia | A63F 13/792 |
| 2018/0249501 A1* | 8/2018 | Ko | H04W 52/243 |
| 2018/0263038 A1* | 9/2018 | Zhou | H04W 52/48 |
| 2018/0302862 A1* | 10/2018 | Takata | H04W 52/18 |
| 2018/0324596 A1* | 11/2018 | Xiang | H04W 74/006 |
| 2018/0324851 A1* | 11/2018 | Zhang | H04W 74/006 |
| 2018/0343096 A1* | 11/2018 | Kim | H04L 27/2602 |
| 2019/0004166 A1* | 1/2019 | Orlowski | G01S 13/726 |
| 2019/0007973 A1* | 1/2019 | Lou | H04W 74/006 |
| 2019/0028898 A1* | 1/2019 | Ko | H04W 52/34 |
| 2019/0141749 A1* | 5/2019 | Seok | H04W 72/0473 |
| 2019/0182842 A1* | 6/2019 | Hu | H04L 27/2626 |
| 2019/0215132 A1* | 7/2019 | Malisetty | H04W 72/541 |
| 2019/0230703 A1* | 7/2019 | Lv | H04W 74/0808 |
| 2019/0246302 A1* | 8/2019 | Park | H04W 72/542 |
| 2019/0268192 A1* | 8/2019 | Lim | H04L 5/0012 |
| 2019/0273575 A1* | 9/2019 | Sugaya | H04L 1/1607 |
| 2019/0313328 A1* | 10/2019 | Ma | H04W 16/02 |
| 2019/0327741 A1* | 10/2019 | Li | H04W 72/0453 |
| 2019/0342017 A1* | 11/2019 | Barriac | H04W 72/23 |
| 2020/0045637 A1* | 2/2020 | Noh | H04W 52/0229 |
| 2020/0077273 A1* | 3/2020 | Cherian | H04W 24/10 |
| 2020/0077350 A1* | 3/2020 | Gidvani | H04W 48/16 |
| 2020/0145930 A1* | 5/2020 | Park | H04W 52/383 |
| 2020/0213860 A1* | 7/2020 | Ko | H04W 28/20 |
| 2020/0213861 A1* | 7/2020 | Ko | H04W 52/34 |
| 2020/0396695 A1* | 12/2020 | Bhushan | H04B 17/336 |
| 2020/0404549 A1* | 12/2020 | Verma | H04W 24/10 |
| 2021/0014695 A1* | 1/2021 | Minotani | H04W 16/14 |
| 2021/0051660 A1* | 2/2021 | Askar | H04W 72/541 |
| 2021/0075566 A1* | 3/2021 | Guo | H04W 72/21 |
| 2021/0195540 A1* | 6/2021 | Fischer | H04W 56/0005 |
| 2021/0273741 A1* | 9/2021 | Sugaya | H04W 74/002 |
| 2021/0360694 A1* | 11/2021 | Pandian | H04W 72/541 |
| 2021/0377750 A1* | 12/2021 | Sugaya | H04W 24/02 |
| 2021/0385779 A1* | 12/2021 | Oteri | H04B 7/024 |
| 2022/0029697 A1* | 1/2022 | Bakr | H04B 7/18506 |
| 2022/0104143 A1* | 3/2022 | Chang | H04W 28/10 |
| 2022/0141821 A1* | 5/2022 | D'Oro | H04L 41/0895 455/452.1 |
| 2022/0240239 A1* | 7/2022 | Xia | H04W 72/046 |
| 2022/0264336 A1* | 8/2022 | Sugaya | H04B 17/0085 |
| 2022/0329308 A1* | 10/2022 | Huang | H04B 7/0456 |
| 2022/0338066 A1* | 10/2022 | Chitrakar | H04W 72/541 |
| 2022/0386374 A1* | 12/2022 | Kawamura | H04W 76/10 |
| 2022/0400500 A1* | 12/2022 | Xia | H04W 76/15 |

(56) References Cited

U.S. PATENT DOCUMENTS

| | | | |
|---|---|---|---|
| 2023/0009996 A1* | 1/2023 | Ciochina | H04W 52/367 |
| 2023/0037649 A1* | 2/2023 | Lv | H04W 74/02 |
| 2023/0059567 A1* | 2/2023 | Zhang | H04W 74/006 |
| 2023/0075377 A1* | 3/2023 | Guo | H04W 74/00 |
| 2023/0093950 A1* | 3/2023 | Demir | H01Q 19/005 |
| | | | 370/503 |
| 2023/0105571 A1* | 4/2023 | Mohamed | H04W 24/10 |
| | | | 370/329 |
| 2023/0105964 A1* | 4/2023 | Park | H04B 17/347 |
| | | | 370/318 |
| 2023/0108231 A1* | 4/2023 | Thota | H04W 74/0808 |
| | | | 370/329 |
| 2023/0122711 A1* | 4/2023 | Sun | H04L 5/0035 |
| | | | 370/329 |
| 2023/0134239 A1* | 5/2023 | Lu | H04L 43/106 |
| | | | 370/252 |
| 2023/0189337 A1* | 6/2023 | Sun | H04B 17/318 |
| 2023/0209362 A1* | 6/2023 | Minotani | H04W 72/04 |
| | | | 370/329 |
| 2023/0284041 A1* | 9/2023 | Yu | H04W 16/28 |
| | | | 370/329 |
| 2023/0319876 A1* | 10/2023 | Inoue | H04W 74/0808 |
| 2023/0325864 A1* | 10/2023 | Xia | H04W 72/046 |
| | | | 463/25 |
| 2023/0413062 A1* | 12/2023 | Park | H04L 27/2603 |
| 2023/0422043 A1* | 12/2023 | Park | H04L 5/0023 |
| 2024/0040531 A1* | 2/2024 | Oteri | H04W 76/15 |
| 2024/0049052 A1* | 2/2024 | Peng | H04W 28/06 |
| 2024/0064047 A1* | 2/2024 | Park | H04L 5/0091 |
| 2024/0072951 A1* | 2/2024 | Guo | H04W 74/04 |
| 2024/0072953 A1* | 2/2024 | Matsuo | H04B 7/0452 |
| 2024/0073948 A1* | 2/2024 | Park | H04L 5/0096 |
| 2024/0080146 A1* | 3/2024 | Cherian | H04W 72/541 |
| 2024/0080824 A1* | 3/2024 | Park | H04L 5/0094 |
| 2024/0098712 A1* | 3/2024 | Chitrakar | H04W 72/0446 |
| 2024/0147274 A1* | 5/2024 | Oteri | H04W 24/08 |
| 2024/0259825 A1* | 8/2024 | Minotani | H04W 16/14 |

FOREIGN PATENT DOCUMENTS

| | | | | |
|---|---|---|---|---|
| CN | 112689289 A | | 4/2021 | |
| EP | 3139671 B1 | * | 4/2019 | ............ H04B 17/345 |
| EP | 3687101 A1 | * | 7/2020 | ............ H04L 5/0037 |
| EP | 3879743 A1 | * | 9/2021 | ............ H04L 1/0013 |
| EP | 4311361 A2 | * | 1/2024 | ............ H04L 5/0037 |
| WO | WO-2015112780 A1 | * | 7/2015 | ......... H04L 12/6418 |

* cited by examiner

METHOD FOR SENDING DATA AND APPARATUS, STORAGE MEDIUM, PROCESSOR, AND ACCESS POINT (AP) TERMINAL

CROSS-REFERENCE TO RELATED APPLICATION(S)

This application is a continuation of U.S. Non-Provisional patent application Ser. No. 18/287,181, filed on Oct. 17, 2023, which is based on International Patent Application No. PCT/CN2022/131523, filed on Nov. 11, 2022, which claims the priority of Chinese Patent Application No. 202111554996.7, filed to the China National Intellectual Property Administration on Dec. 17, 2021. All of the aforementioned patent applications are incorporated herein their entirety by reference.

TECHNICAL FIELD

The present disclosure relates to the technical field of wireless communication, and in particular to a method for sending data for sending data and apparatus, a storage medium, a processor, and an AP terminal.

BACKGROUND

During wireless communication, data transmission between an AP and a Station (STA) is susceptible to an Overlap Basic Service Set (OBSS) interference signal. In some cases, although the transmission of data may be completed, the AP may select to communicate with the STA whose power is limited very low, for example, the STA is closer to an interference source, resulting in a significant decrease in data transmission speed, thereby affecting the throughput of a communication system and even affecting the transmission stability.

Therefore, the wireless communication process in the related art has the problems of low data sending speed and poor stability caused by OBSS interference. For the above problems, no effective solution has been proposed.

The above information disclosed in the background part is intended only to enhance an understanding of the background of the technology described herein. Therefore, the background may contain information that is not formed in the known related art to those skilled in the art.

SUMMARY

Embodiments of the present disclosure provide a method for sending data and apparatus, a storage medium, a processor, and an AP terminal.

According to a first aspect of the embodiments of the present disclosure, a method for sending data is provided, which include that: an OBSS interference signal is received; whether a data sending condition is satisfied is determined according to the OBSS interference signal; a plurality of maximum available transmission power corresponding to a plurality of STAs is determined in a case where the data sending condition is satisfied; and sending of the data to a target STA is controlled, the target STA being a STA with a maximum of the maximum available transmission power corresponding to the plurality of STAs.

In some embodiments, operation of determining the plurality of the maximum available transmission power corresponding to the plurality of STAs may include that: a plurality of maximum transmission power corresponding to a plurality of available channels of each of the STAs is determined; and a minimum of the plurality of the maximum transmission power is determined as the maximum available transmission power of the STA.

In some embodiments, the operation of controlling the sending of the data to the target STA may include that: the sending of the data to the target STA through a target channel is controlled, the target channel being a channel used by an AP to prepare to send the data, the channel being determined to be idle through a channel detection mechanism, and the channel being the available channel of the target STA.

In some embodiments, the operation of determining the plurality of maximum available transmission power corresponding to the plurality of STAs in the case where the data sending condition is satisfied may include that: pieces of channel state information corresponding to the plurality of the STAs is received; and the plurality of the maximum available transmission power corresponding to the plurality of the STAs is determined according to the pieces of channel state information.

In some embodiments, before determining the plurality of maximum available transmission power corresponding to the plurality of STAs, the method for sending data may further include that: the pieces of channel state information from the plurality of the STAs is received, each piece of the channel state information including available channel information and transmission power information corresponding to each available channel; the operation of determining the plurality of maximum available transmission power corresponding to the plurality of available channels of each of the STAs include that: the plurality of maximum transmission power corresponding to the plurality of available channels of each of the STAs is determined according to the transmission power information corresponding to the plurality of available channels of each of the STAs; before controlling the sending of the data to the target STA through the target channel, the operation of controlling the sending of the data to the target STA further include that: the target channel is determined according to a detection result of the channel detection mechanism and the available channel information of each of the STAs.

In some embodiments, the operation of determining whether the data sending condition is satisfied according to the OBSS interference signal may include that: whether the power of the OBSS interference signal is less than or equal to a preset threshold is determined; it is determined that the data sending condition is satisfied in a case where the power of the OBSS interference signal is less than or equal to the preset threshold, the OBSS interference signal is a negligible signal, and a communication system enables a spatial reuse function; and it is determined that the data sending condition is not satisfied in a case where the power of the OBSS interference signal is greater than the preset threshold value.

According to a second aspect of the embodiments of the present disclosure, a data sending apparatus is provided, which may include: a receiving component, configured to receive an OBSS interference signal; a first determination component, configured to determine whether a data sending condition is satisfied according to the OBSS interference signal; a second determination component, configured to determine a plurality of maximum available transmission power corresponding to a plurality of STAs in a case where the data sending condition is satisfied; and a control component, configured to control the sending of the data to a target STA, the target STA being the STA with the maximum available transmission power in the plurality of STAs.

According to a third aspect of the embodiments of the present disclosure, a non-volatile storage medium is provided, which may include a stored program. The program, when running, controls a device where the non-volatile storage medium is located to perform the above method for sending data.

According to a fourth aspect of the embodiments of the present disclosure, a processor is provided. The processor may be configured to run a program. The program, when running, performs the above method for sending data.

According to a fifth aspect of the embodiments of the present disclosure, an AP terminal is provided, which may include: a memory, a processor, and a computer program stored in the memory and runnable on the processor. The processor, when executing the computer program, implements the above method for sending data.

BRIEF DESCRIPTION OF DRAWINGS

The drawings described herein are used to provide a further understanding of the present disclosure, and constitute a part of the present application, and the exemplary embodiments of the present disclosure and the description thereof are used to explain the present disclosure, but do not constitute improper limitations to the present disclosure. In the drawings.

DETAILED DESCRIPTION

It is to be noted that embodiments in the present application and features in the embodiments may be combined under the condition of no conflicts. The present application is described below with reference to the drawings and in conjunction with the embodiments in detail.

In order to make the solutions of the present disclosure understood by those skilled in the art, the technical solutions in the embodiments of the present disclosure will be clearly and completely described below in combination with the drawings in the embodiments of the present disclosure. It is apparent that the described embodiments are not all embodiments but only part of embodiments of the present disclosure. All other embodiments obtained by those of ordinary skill in the art on the basis of the embodiments in the present disclosure without creative work shall fall within the scope of protection of the present disclosure.

It is to be noted that terms "first", "second" and the like in the description, claims and the above drawings of the present disclosure are used for distinguishing similar objects rather than describing a specific sequence or a precedence order. It should be understood that the data used in such a way may be exchanged where appropriate, in order that the embodiments of the present disclosure described here may be implemented in an order other than those illustrated or described herein. In addition, terms "include" and "have" and any variations thereof are intended to cover non-exclusive inclusions. For example, it is not limited for processes, methods, systems, products or devices containing a series of steps or components to clearly list those steps or components, and other steps or components which are not clearly listed or are inherent to these processes, methods, products or devices may be included instead.

It should be understood that, when an element (such as a layer, a film, an area or a substrate is described as being "on" another element, it may be directly on another element or there may also be a centered element. Furthermore, in the specification and the claims, where an element is described as being "connected" to another element, it may be "directly connected" to another element or "connected" to another element through a third element.

Figure 1:
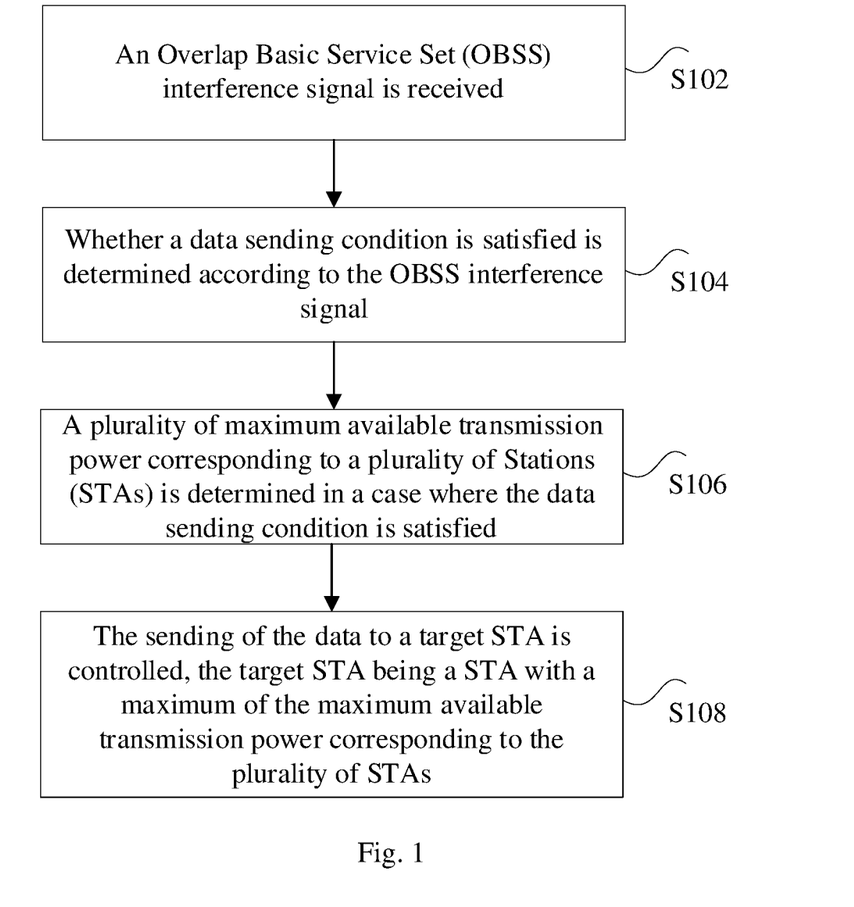
FIG. 1 is a flowchart of an optional embodiment of a method for sending data according to the present disclosure.

FIG. 1 is a method for sending data according to an embodiment of the present disclosure, as shown in FIG. 1, the method includes the following steps.

At S102, an OBSS interference signal is received.

At S104, whether a data sending condition is satisfied is determined according to the OBSS interference signal.

At S106, a plurality of maximum available transmission power corresponding to a plurality of STAs is determined in a case where the data sending condition is satisfied.

At S108, the sending of the data to a target STA is controlled, the target STA being a STA with a maximum of the maximum available transmission power corresponding to the plurality of STAs.

The method for sending data using the above solution includes that: the OBSS interference signal is received; whether the data sending condition is satisfied is determined according to the OBSS interference signal; the plurality of maximum available transmission power corresponding to the plurality of STAs is determined in a case where the data sending condition is satisfied; and the sending of the data to a target STA is controlled, the target STA being the STA with the maximum of the maximum available transmission power corresponding to the plurality of STAs. By using the method for sending data, in a case where it is determined that the data sending condition is satisfied, that is, the OBSS interference signal does not affect the normal transmission of the data, the plurality of maximum available transmission power corresponding to the plurality of STAs may be determined first, and the sending of the data to the STA with the maximum of the maximum available transmission power is controlled, so that the adverse effect on the transmission speed or transmission stability caused by the OBSS interference signal due to the improper selection of the transmission object may be effectively reduced, and the data may be sent to the transmission object with greater benefit, which is beneficial to improving the throughput of the communication system and solves the problems of low data sending speed and poor stability caused by OBSS interference in the related art.

The plurality of maximum available transmission power corresponding to the plurality of STAs is determined, namely, the plurality of maximum available transmission power is determined, and the plurality of maximum available transmission power corresponds to the plurality of STAs one by one.

Specifically, the operation of determining a plurality of maximum available transmission power corresponding to a plurality of STAs includes that: a plurality of maximum available transmission power corresponding to a plurality of available channels of each of the STAs is determined; and the minimum of the plurality of the maximum transmission power is determined as the maximum available transmission power of the STA.

Each STA may have a plurality of available channels, and each available channel may correspond to one maximum transmission power. The maximum available transmission power of the STA is the minimum of the plurality of maximum transmission power corresponding to the plurality of available channels of the STA, rather than saying that the one with the maximum transmission power of the plurality of available channels is the maximum available transmission power of the STA. When the AP performs selection, for example, intends to send on the primary 40 MHz, whether the primary 40 MHz of each STA is available may be determined first, and then the STA with the maximum of the maximum available transmission power is selected to communicate in the STAs with available primary 40 MHz channels. However, the maximum available transmission power is the minimum of the maximum transmission power of the two 20 MHz channels corresponding to the primary 40 MHz channel, since the maximum transmission power is a limit value, the stability of the communication system may be ensured by determining the maximum available transmission power with the minimum limit value.

Specifically, the operation of controlling the sending of the data to a target STA includes that: the sending of the data to the target STA through a target channel is controlled, the target channel being a channel used by an AP to prepare to send the data, the channel being determined to be idle through a channel detection mechanism, and the channel being the available channel of the target STA.

In addition, if the AP sends a trigger frame, the maximum available channel in the maximum available transmission power of each STA may be selected as a channel resource allocated to the STA.

In the above embodiment, more is the selection of the STA in a case of describing the sending of an individually addressed frame by the AP. In actual use, there are many application scenarios, such as the above sending of the trigger frame, the trigger frame is only sent by the AP, namely, different bandwidth resources are allocated to various STA in the trigger frame, and then the STA may perform uplink multi-user transmission on these allocated channels. In this case, it should be considered to select the channel with the best channel condition in each STA for allocation.

Specifically, the operation of determining a plurality of maximum available transmission power corresponding to a plurality of STAs in a case where the data sending condition is satisfied includes that: pieces of channel state information corresponding to the plurality of the STAs is received; and the plurality of the maximum available transmission power corresponding to the plurality of the STAs are determined according to the pieces of channel state information.

That is, in the process of determining the plurality of maximum available transmission power corresponding to the plurality of STAs, the determination is performed according to the channel state information reported by each STA. Specifically, the plurality of STAs may report the channel state information actively, for example, at preset intervals, or when the channel state information changes. The plurality of STAs may report the channel state information passively after receiving a report command from the AP terminal.

Specifically, before determining the plurality of maximum available transmission power corresponding to the plurality of STAs, the method for sending data further includes that: the pieces of channel state information from the plurality of the STAs is received, each piece of the channel state information including available channel information and transmission power information corresponding to each available channel. The operation of determining a plurality of maximum available transmission power corresponding to a plurality of available channels of each of the STAs includes that: the plurality of maximum transmission power corresponding to the plurality of available channels of each of the STAs is determined according to the transmission power information corresponding to the plurality of available channels of each of the STAs. Before controlling the sending of the data to the target STA through the target channel, the operation of controlling the sending of the data to the target STA further includes that: the target channel is determined according to a detection result of the channel detection mechanism and the available channel information of each of the STAs.

In the embodiment, the channel state information sent by each STA includes available channel information and transmission power information corresponding to each available channel. Based on this, the plurality of maximum transmission power corresponding to the plurality of available channels of each of the STAs is determined, and when it is determined that the target STA sends data to the target STA through the target channel, the higher data sending speed and transmission stability may be ensured.

Specifically, the operation of determining whether a data sending condition is satisfied according to the OBSS interference signal includes that: whether the power of the OBSS interference signal is less than or equal to a preset threshold is determined; it is determined that the data sending condition is satisfied in a case where the power of the OBSS interference signal is less than or equal to the preset threshold, the OBSS interference signal is a negligible signal, and a communication system enables a spatial reuse function; and it is determined that the data sending condition is not satisfied in a case where the power of the OBSS interference signal is greater than the preset threshold value.

In the embodiment, when the OBSS interference signal is received, it is determined whether the data sending condition is satisfied according to the power of the OBSS interference signal. If the power is less than or equal to the preset threshold, the OBSS interference signal is the negligible signal and the communication system enables the spatial reuse function, it is determined that the data sending condition is satisfied, otherwise it is determined that the data sending condition is not satisfied. That is, the operation of determining whether a data sending condition is satisfied according to the OBSS interference signal includes that: whether the power of the OBSS interference signal is less than or equal to the preset threshold is determined; and in a case where the power of the OBSS interference signal is less than or equal to the preset threshold, if other conditions are satisfied, it is determined that the data sending condition is satisfied. The above other conditions include that the OBSS interference signal is not the non-negligible signal, such as a non-High Throughput Physical Layer Protocol Data Unit (non-HT PPDU) carrying a response frame, a non-High Efficiency (non-HE) PPDU carrying a Public Action frame, and that the spatial reuse mechanism is not disabled. In a case where the power of the OBSS interference signal is greater than the preset threshold, it is determined that the data sending condition is not satisfied. This enables reuse of spectrum resources between OBSSs in densely deployed scenarios, which improves the performance in multi-user scenarios.

Figure 2:
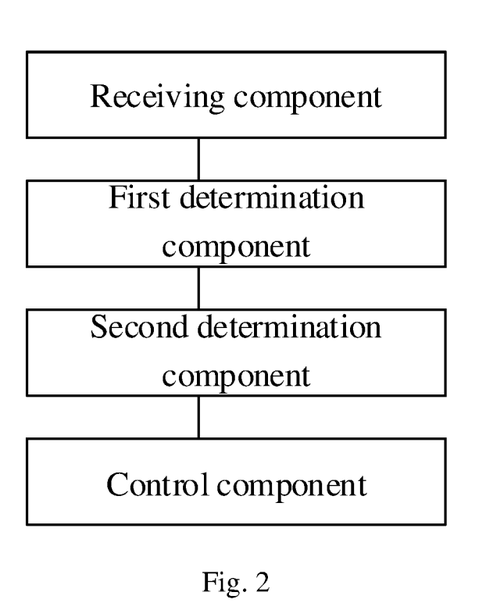
FIG. 2 is a schematic diagram of an optional embodiment of a data sending apparatus according to the present disclosure.

Second, as shown in FIG. 2, the embodiments of the present disclosure also provide a data sending apparatus, which includes: a receiving component, configured to receive an OBSS interference signal; a first determination component, configured to determine whether a data sending condition is satisfied according to the OBSS interference signal; a second determination component, configured to determine a plurality of maximum available transmission power corresponding to a plurality of STAs in a case where the data sending condition is satisfied; and a control component, configured to control the sending of the data to a target STA, the target STA being a STA with a maximum of the maximum available transmission power corresponding to the plurality of STAs.

The second determination component includes a first determination component and a second determination component. The first determination component is configured to determine a plurality of maximum available transmission power corresponding to a plurality of available channels of each of the STAs. The second determining component is configured to determine the minimum of the plurality of the maximum transmission power as the maximum available transmission power of the STA.

Specifically, the control component is configured to: control the sending of the data to the target STA through a target channel, the target channel being a channel used by an AP to prepare to send the data, the channel being determined to be idle through a channel detection mechanism, and the channel being the available channel of the target STA.

The second determination component includes a receiving component and a third determination component. The receiving component is configured to receive pieces of channel state information corresponding to the plurality of the STAs. The third determination component is configured to determine the plurality of the maximum available transmission power corresponding to the plurality of the STAs according to the pieces of channel state information.

Specifically, before determining the plurality of maximum available transmission power corresponding to the plurality of STAs, the data sending apparatus further includes: a state information receiving component, configured to receive the pieces of channel state information from the plurality of the STAs, each piece of the channel state information including available channel information and transmission power information corresponding to each available channel. The second determination component is configured to: determine the plurality of maximum transmission power corresponding to the plurality of available channels of each of the STAs according to the transmission power information corresponding to the plurality of available channels of each of the STAs. Before controlling the sending of the data to the target STA through the target channel, the control component is also configured to: determine the target channel according to a detection result of the channel detection mechanism and the available channel information of each of the STAs.

The first determination component includes a fourth determination component, a fifth determination component and a sixth determination component. The fourth determination component is configured to determine whether the power of the OBSS interference signal is less than or equal to a preset threshold. The fifth determination component is configured to determine that the data sending condition is satisfied in a case where the power of the OBSS interference signal is less than or equal to the preset threshold, the OBSS interference signal is a negligible signal, and a communication system enables a spatial reuse function. The sixth determination component is configured to determine that the data sending condition is not satisfied in a case where the power of the OBSS interference signal is greater than the preset threshold value.

In addition, the embodiments of the present disclosure also provide a non-volatile storage medium, which includes a stored program. The program, when running, controls a device where the non-volatile storage medium is located to perform the above method for sending data.

Again, the embodiments of the present disclosure also provide a processor, configured to run a program. The program, when running, performs the above method for sending data.

Finally, the embodiments of the present disclosure also provide an AP terminal, which includes: a memory, a processor, and a computer program stored in the memory and runnable on the processor. The processor, when executing the computer program, implements the above method for sending data.

Figure 3:
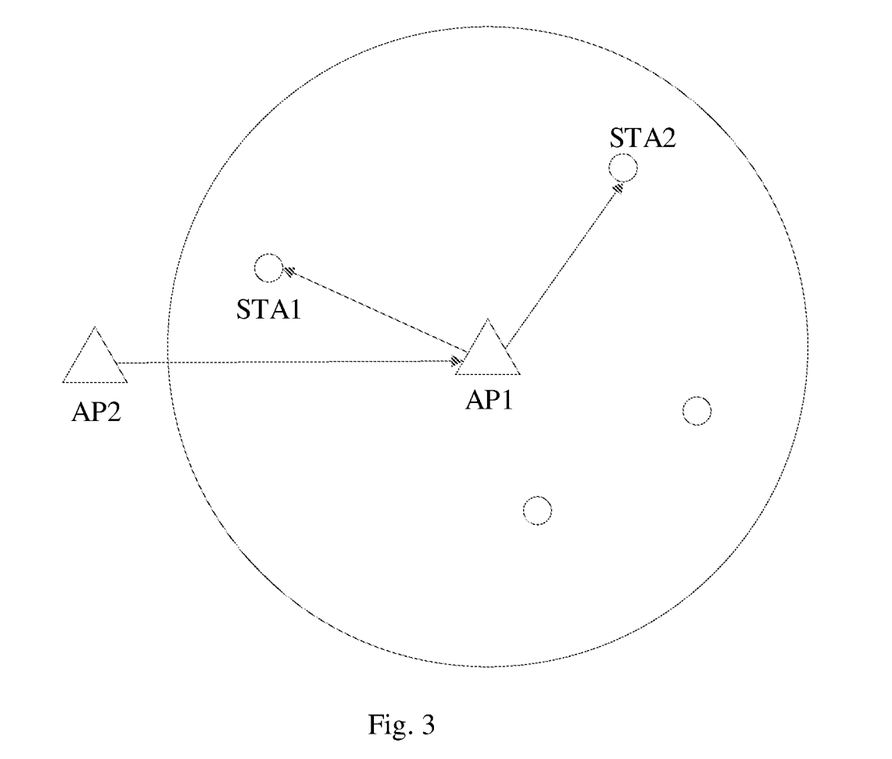
FIG. 3 is a schematic diagram of data transmission of a communication system applying a method for sending data according to an embodiment of the present disclosure.

The following is described by a specific embodiment. As shown in FIG. 3, assuming that AP1 receives a frame sent by OBSS AP2 and the interference power is less than an OBSS Packet Detection (PD) threshold, AP1 may send the frame to STA1 or STA2 after neglecting the frame. However, if a data receiving object is not selected, since STA1 is closer to the interference source AP2, the probability of the communication failure between AP1 and STA1 is significantly higher than the probability of the communication failure between AP1 and STA2. In addition, if STA1 also neglects the interference source, the limiting power is smaller, that is, a Signal to Interference plus Noise Ratio (SINR) arriving at AP1 may be lower, then for more stable transmission, it may select a lower rate for transmission, and the throughput is lower compared to STA2. That is, the speed and stability of data transmission between AP1 and STA1 are poor.

However, in the embodiment, AP1 may receive the channel state information from STA1 and STA2 so as to determine the available channel information of STA1 and STA2 and the transmission power information corresponding to each available channel, for example, a Bandwidth Query Report (BQR) control subfield in QoS data frame, QoS Null frame, and management frame can be used to carry the transmission power information corresponding to the available channel, or so-called available channel power limit information. For example, in the embodiment, the BQR control information is referred to as extended BQR control information and includes an available channel bitmap, a reserved field and available channel power limit information, the available channel bitmap including a total of 8 bits, each bit indicates whether a corresponding 20 MHz sub-channel of a Basic Service Set (BSS) associated with the STA is available or not, 1 indicates that the sub-channel is idle and available, and 0 indicates that the sub-channel is not available.

The available channel power limit information indicates the maximum available sending power on each available 20 MHz sub-channel, for example, it is obtained according to the maximum power limit value calculated in the spatial reuse mechanism as well as the information such as the maximum transmission power and the local maximum transmission power of the channel in the current regulatory domain Herein, the maximum power limit value means that if the STA neglects the OBSS transmission at the selected OBSS PD level and starts a sending power limit period, the combining power of the STA at the sending antenna end should be less than or equal to the maximum power limit value for PPDU sending during the sending power limit period.

The length of the available channel power limit information varies according to the available channel bitmap. For example, the available channel bitmap indicates: 11001111, the bit length of the available channel power limit information is N×6, where N represents that the power limit of each sub-channel is divided into 2N levels, and the higher the level, the greater the maximum limit power, namely, the greater the maximum available transmission power on the sub-channel. No explicit value is given to N here, the greater N, the finer the power division, and N may be uniformly specified by the AP. Assuming that N=3, that is, the power limit of each available 20 MHz channel is divided into 8 levels, and likewise taking the indication of the available channel bitmap as 11001111 as an example, the available channel power limit information has 6 pieces of 3-bit information respectively indicating power limit level values of the corresponding available sub-channels.

After receiving the OBSS interference, if the power of the OBSS interference signal is less than or equal to the preset threshold, other limiting conditions are satisfied, and the OBSS transmission is neglected, by looking at the extended BQR control information previously reported by the STA, an optimal STA may be comprehensively analyzed and selected for transmission or an optimal sub-channel is selected for resource allocation for one STA in uplink multi-user transmission, for example, the STA with the maximum limit power is selected on its target channel as a transmission object, and a sub-channel with the maximum limit power on its available channel may also be selected for uplink resource allocation for one STA.

An example is given below, assuming that N=3, that is, the power is divided into 8 levels, the AP receives a signal from the OBSS, the data sending condition is satisfied, the OBSS transmission is neglected, the channel is competed, and then the transmission object is selected.

If the extended BQR control information about its associated STA1 and STA2 obtained by the AP is respectively:
- STA1: the available channel bitmap is 11110000, and the available channel power limit information is 010 011 010 010, namely, STA1 has four available 20 MHz sub-channels, and the maximum available transmission power values of various sub-channels are respectively at level 2, level 3, level 2 and level 2.
- STA2: the available channel bitmap is 11110000, and the available channel power limit information is 110 110 110 110, namely, STA2 has the same four available 20 MHz sub-channels, but the maximum power of each sub-channel is at level 6.

If the AP performs independently addressed data transmission on the target channel being the primary 40 MHz channel, and selects one STA from the above two associated STAs for data transmission, the AP may select STA2 as the transmission object, and compared with STA1, the maximum available transmission power of STA2 is far higher than that of STA1, namely, the AP may perform transmission at a higher rate, and the AP may obtain a higher benefit in communication therewith.

If the AP performs uplink multi-user transmission on the target channel being the primary 40 MHz channel, the AP may select a secondary 20 MHz channel (with a higher power limit level than other 20 MHz channels) as the best allocated channel resource for STA1.

The sequence numbers of the embodiments of the present disclosure are adopted not to represent superiority-inferiority of the embodiments but only for description. Furthermore, the steps shown in the flowchart of the drawings may be executed in a computer system, such as a set of computer-executable instructions, and although a logical sequence is shown in the flowchart, in some cases, the steps shown or described may be executed in a different order than here.

In the above embodiments of the present disclosure, the description of the embodiments has its own focus. For parts that are not described in detail in a certain embodiment, reference may be made to related descriptions of other embodiments.

In the several embodiments provided in the present disclosure, it should be understood that, the disclosed technical content may be implemented in other ways. The apparatus embodiments described above are merely illustrative. For example, the division of the components may be a logical function division, and there may be other divisions in actual implementation. For example, a plurality of units or components may be combined or integrated into another system, or some features may be ignored, or not implemented. In addition, the displayed or discussed mutual coupling or direct coupling or communication connection may be indirect coupling or communication connection through some interfaces, units or components, and may be in electrical or other forms.

The units described as separate components may or may not be physically separated. The components displayed as units may or may not be physical units, that is, the components may be located in one place, or may be distributed on the plurality of units. Part or all of the units may be selected according to actual requirements to achieve the purposes of the solutions of this embodiment.

In addition, the functional components in the various embodiments of the present disclosure may be integrated into one processing component, or each component may exist alone physically, or two or more than two components may be integrated into one component. The above integrated component may be implemented in the form of hardware, or may be implemented in the form of a software functional component.

If the integrated component is implemented in the form of the software functional component and sold or used as an independent product, it may be stored in the computer readable storage medium. Based on this understanding, the technical solutions of the present disclosure essentially or the parts that contribute to the conventional art, or all or part of the technical solutions may be embodied in the form of a software product. The computer software product is stored in a storage medium, including a plurality of instructions for causing a computer device (which may be a personal computer, a server, or a network device, and the like) to execute all or part of the steps of the method described in the various embodiments of the present disclosure. The foregoing storage medium includes a USB flash disk, a Read-Only Memory (ROM), a Random Access Memory (RAM), and various media that may store program codes, such as a mobile hard disk, a magnetic disk, or an optical disk.

The above description is merely preferred implementation modes of the present disclosure, and it is to be noted that those of ordinary skill in the art may also make several improvements and refinements without departing from the principle of the present disclosure, and it should be considered that these improvements and refinements shall all fall within the protection scope of the present disclosure.

The invention claimed is:

1. A method for sending data, comprising:
   receiving an Overlap Basic Service Set (OBSS) interference signal;
   determining whether a data sending condition is satisfied according to the OBSS interference signal;
   determining a plurality of maximum available transmission power corresponding to a plurality of Stations (STAs) in a case where the data sending condition is satisfied; and controlling sending of the data to a target STA, the target STA being a STA with a maximum of the maximum available transmission power corresponding to the plurality of STAs, wherein determining the plurality of the maximum available transmission power corresponding to the plurality of STAs comprises:

determining a plurality of maximum transmission power corresponding to a plurality of available channels of each of the STAs; and determining a minimum of the plurality of the maximum transmission power as the maximum available transmission power of the STA.

2. The method for sending data according to claim 1, wherein controlling the sending of the data to the target STA comprises:

controlling the sending of the data to the target STA through a target channel, the target channel being a channel used by an Access Point (AP) to prepare to send the data, the channel being determined to be idle through a channel detection mechanism, and the channel being the available channel of the target STA.

3. The method for sending data according to claim 1, wherein determining the plurality of maximum available transmission power corresponding to the plurality of STAs in the case where the data sending condition is satisfied comprises:

receiving pieces of channel state information corresponding to the plurality of the STAs; and determining the plurality of the maximum available transmission power corresponding to the plurality of the STAs according to the pieces of channel state information.

4. The method for sending data according to claim 2, wherein before determining the plurality of maximum available transmission power corresponding to the plurality of STAs, the method further comprises: receiving the pieces of channel state information from the plurality of the STAs, each piece of the channel state information comprising available channel information and transmission power information corresponding to each available channel;

determining the plurality of maximum available transmission power corresponding to the plurality of available channels of each of the STAs comprises: determining the plurality of maximum transmission power corresponding to the plurality of available channels of each of the STAs according to the transmission power information corresponding to the plurality of available channels of each of the STAs; and before controlling the sending of the data to the target STA through the target channel, controlling the sending of the data to the target STA further comprises: determining the target channel according to a detection result of the channel detection mechanism and the available channel information of each of the STAs.

5. The method for sending data according to claim 1, wherein determining whether the data sending condition is satisfied according to the OBSS interference signal comprises:

determining whether the power of the OBSS interference signal is less than or equal to a preset threshold;

determining that the data sending condition is satisfied in a case where the power of the OBSS interference signal is less than or equal to the preset threshold; and determining that the data sending condition is not satisfied in a case where the power of the OBSS interference signal is greater than the preset threshold value.

6. The method for sending data according to claim 2, wherein determining the plurality of maximum available transmission power corresponding to the plurality of STAs in the case where the data sending condition is satisfied comprises:

receiving pieces of channel state information corresponding to the plurality of the STAs; and determining the plurality of the maximum available transmission power corresponding to the plurality of the STAs according to the pieces of channel state information.

7. The method for sending data according to claim 4, wherein the STAs carries the transmission power information corresponding to the plurality of available channels in a target transmission frame, the type of the target transmission frame comprises at least one of the following: QoS data frame, QoS Null frame, and management frame.

8. The method for sending data according to claim 7, wherein a control subfield of the target transmission frame comprises: an available channel bitmap, a reserved field, and the transmission power information corresponding to the plurality of available channels; wherein the available channel bitmap comprises a plurality of bits, each of the bit is used to indicate whether the corresponding available channel is available.

9. A data sending apparatus, comprising:

a receiving component, configured to receive an Overlap Basic Service Set (OBSS) interference signal;

a first determination component, configured to determine whether a data sending condition is satisfied according to the OBSS interference signal;

a second determination component, configured to determine a plurality of maximum available transmission power corresponding to a plurality of Stations (STAs) in a case where the data sending condition is satisfied; and a control component, configured to control the sending of the data to a target STA, the target STA being a STA with a maximum of the maximum available transmission power corresponding to the plurality of the STAs, wherein the second determination component comprises:

a first determination component, configured to determine a plurality of maximum available transmission power corresponding to a plurality of available channels of each of the STAs;

a second determination component, configured to determine the minimum of the plurality of the maximum transmission power as the maximum available transmission power of the STA.

10. The data sending apparatus according to claim 9, wherein the control component is configured to: control the sending of the data to the target STA through a target channel, the target channel being a channel used by an AP to prepare to send the data, the channel being determined to be idle through a channel detection mechanism, and the channel being the available channel of the target STA.

11. The data sending apparatus according to claim 9, wherein the second determination component comprises:

a receiving component, configured to receive a plurality of pieces of channel state information corresponding to the plurality of the STAs;

a third determination component, configured to determine the plurality of the maximum available transmission power corresponding to the plurality of the STAs according to the plurality of pieces of channel state information.

12. The data sending apparatus according to claim 10, wherein the data sending apparatus further comprises:
- a state information receiving component, configured to receive the plurality of pieces of channel state information from the plurality of the STAs, before determining the plurality of maximum available transmission power corresponding to the plurality of STAs, each piece of the channel state information including available channel information and transmission power information corresponding to each available channel;
- the second determination component is configured to: determine the plurality of maximum transmission power corresponding to the plurality of available channels of each of the STAs according to the transmission power information corresponding to the plurality of available channels of each of the STAs;
- the control component is also configured to: before controlling the sending of the data to the target STA through the target channel, determine the target channel according to a detection result of the channel detection mechanism and the available channel information of each of the STAs.

13. The data sending apparatus according to claim 9, wherein the first determination component comprises:
- a fourth determination component, configured to determine whether the power of the OBSS interference signal is less than or equal to a preset threshold;
- a fifth determination component, configured to determine that the data sending condition is satisfied in a case where the power of the OBSS interference signal is less than or equal to the preset threshold;
- a sixth determination component, configured to determine that the data sending condition is not satisfied in a case where the power of the OBSS interference signal is greater than the preset threshold value.

14. The data sending apparatus according to claim 12, wherein the transmission power information corresponding to the plurality of available channels is carried in a target transmission frame, the type of the target transmission frame comprises at least one of the following: QoS data frame, QoS Null frame, and management frame.

15. An Access Point (AP) terminal, comprising a memory, a processor, and a computer program stored in the memory and runnable on the processor, wherein the processor, when executing the computer program, is enabled to:
- receive an Overlap Basic Service Set (OBSS) interference signal;
- determine whether a data sending condition is satisfied according to the OBSS interference signal;
- determine a plurality of maximum available transmission power corresponding to a plurality of Stations (STAs) in a case where the data sending condition is satisfied; and
- control sending of the data to a target STA, the target STA being a STA with a maximum of the maximum available transmission power corresponding to the plurality of the STAs,
- wherein to determine a plurality of maximum available transmission power corresponding to a plurality of Stations (STAs), the processor, when executing the computer program, is enabled to:
  - determine a plurality of maximum transmission power corresponding to a plurality of available channels of each of the STAs; and
  - determine a minimum of the plurality of the maximum transmission power as the maximum available transmission power of the STA.

16. The AP terminal according to claim 15, wherein the processor, when executing the computer program, is enabled to: control the sending of the data to the target STA through a target channel, the target channel being a channel used by an AP to prepare to send the data, the channel being determined to be idle through a channel detection mechanism, and the channel being the available channel of the target STA.

17. The AP terminal according to claim 15, wherein the processor, when executing the computer program, is enabled to:
- receive a plurality of pieces of channel state information corresponding to the plurality of the STAs; and
- determine the plurality of the maximum available transmission power corresponding to the plurality of the STAs according to the plurality of pieces of channel state information.

18. The AP terminal according to claim 16, wherein the processor, when executing the computer program, is enabled to:
- receive the plurality of pieces of channel state information from the plurality of the STAs, before determining the plurality of maximum available transmission power corresponding to the plurality of STAs, each piece of the channel state information including available channel information and transmission power information corresponding to each available channel;
- determine the plurality of maximum transmission power corresponding to the plurality of available channels of each of the STAs according to the transmission power information corresponding to the plurality of available channels of each of the STAs; and
- before controlling the sending of the data to the target STA through the target channel, determine the target channel according to a detection result of the channel detection mechanism and the available channel information of each of the STAs.

19. The AP terminal according to claim 15, wherein the processor, when executing the computer program, is enabled to:
- determine whether the power of the OBSS interference signal is less than or equal to a preset threshold;
- determine that the data sending condition is satisfied in a case where the power of the OBSS interference signal is less than or equal to the preset threshold; and
- determine that the data sending condition is not satisfied in a case where the power of the OBSS interference signal is greater than the preset threshold value.

20. The AP terminal according to claim 18, wherein the transmission power information corresponding to the plurality of available channels is carried in a target transmission frame, the type of the target transmission frame comprises at least one of the following: QoS data frame, QoS Null frame, and management frame.

* * * * *